United States Patent
Park et al.

(10) Patent No.: US 9,960,436 B2
(45) Date of Patent: May 1, 2018

(54) ION FILTER LIFE PERCEPTION DEVICE FOR FUEL CELL VEHICLE

(71) Applicant: Hyundai Motor Company, Seoul (KR)

(72) Inventors: Hun Woo Park, Gyeonggi-do (KR); Sung Wook Na, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 126 days.

(21) Appl. No.: 14/870,140

(22) Filed: Sep. 30, 2015

(65) Prior Publication Data

US 2016/0172690 A1    Jun. 16, 2016

(30) Foreign Application Priority Data

Dec. 12, 2014   (KR) .................. 10-2014-0179604

(51) Int. Cl.
| | |
|---|---|
| *H01M 8/04* | (2016.01) |
| *H01M 8/04029* | (2016.01) |
| *H01M 8/04044* | (2016.01) |
| *H01M 8/04007* | (2016.01) |

(52) U.S. Cl.
CPC ... *H01M 8/04029* (2013.01); *H01M 8/04044* (2013.01); *H01M 8/04074* (2013.01); *H01M 2250/20* (2013.01); *Y02T 90/32* (2013.01)

(58) Field of Classification Search
CPC ......... H01M 8/04029; H01M 8/04044; H01M 8/04074; Y02T 90/32
USPC ...................................................... 429/437
See application file for complete search history.

(56) References Cited

U.S. PATENT DOCUMENTS

| | | |
|---|---|---|
| 6,495,823 B1 | 12/2002 | Miller et al. |
| 7,442,454 B2 | 10/2008 | Wakabayashi |
| 2004/0131902 A1* | 7/2004 | Frank ................ H01M 8/04007 429/421 |
| 2004/0170877 A1 | 9/2004 | Wakabayashi |
| 2005/0058868 A1* | 3/2005 | Taga ................ H01M 8/04044 429/434 |
| 2005/0115882 A1 | 6/2005 | Curello et al. |
| 2008/0118785 A1 | 5/2008 | Curello et al. |
| 2012/0020102 A1* | 1/2012 | Lambert ................ B60K 35/00 362/503 |

FOREIGN PATENT DOCUMENTS

| | | |
|---|---|---|
| JP | 2004-255372 A | 9/2004 |
| JP | 4481577 B2 | 6/2010 |
| JP | 5452578 B2 | 3/2014 |
| KR | 2006-0114700 A | 11/2006 |
| KR | 2011-0061731 A | 6/2011 |
| KR | 2012-0016059 A | 2/2012 |
| KR | 10-1428413 B1 | 8/2014 |

* cited by examiner

*Primary Examiner* — Basia Ridley
*Assistant Examiner* — James Erwin
(74) *Attorney, Agent, or Firm* — Mintz Levin Cohn Ferris Glovsky and Popeo, P.C.; Peter F. Corless

(57) ABSTRACT

An ion filter life perception device for a fuel cell vehicle is provided to detect a replacement life of a fuel cell ion filter cartridge. The device includes a body part that is installed within an ion filter and has an ion resin filled therein. A checker is disposed within the body part and has a varying position based on a volume of the ion resin. In addition, an elastic member is disposed between a first side end in the body part and the checker to push the checker within the body part by elasticity.

7 Claims, 4 Drawing Sheets

ION FILTER LIFE PERCEPTION DEVICE FOR FUEL CELL VEHICLE

CROSS-REFERENCE TO RELATED APPLICATION

This application is based on and claims the benefit of priority to Korean Patent Application No. 10-2014-0179604, filed on Dec. 12, 2014 in the Korean Intellectual Property Office, the disclosure of which is incorporated herein in its entirety by reference.

TECHNICAL FIELD

The present disclosure relates to an ion filter life perception device for a fuel cell vehicle, and more particularly, to an ion filter life perception device for a fuel cell vehicle that detects replacement life of a fuel cell ion filter cartridge.

BACKGROUND

Recently, an eco-friendly electric vehicle which may have reduced energy consumption and environmental pollution has been variously developed, such as, an eco-friendly electric vehicle which includes a fuel cell vehicle and a hybrid vehicle. The fuel cell vehicle is a vehicle that uses electricity generated by an electrochemical reaction of hydrogen and oxygen as an energy source. The hybrid vehicle is a vehicle that uses an internal combustion engine while driven at a high speed or driven on an uphill road and uses electricity as the energy source while it is driven at a low speed or stopped.

Generally, the existing internal combustion engine vehicle is driven by driving power which is generated by an explosive reaction of fossil fuel with oxygen in the air within an engine to convert the chemical energy into mechanical energy, while the fuel cell vehicle is driven by electric energy which is generated by an electrochemical reaction of hydrogen supplied through a high pressure hydrogen tank or a reformer with oxygen in the air supplied through an air turbo compressor within a fuel cell stack. In other words, the fuel cell system is an apparatus that directly converts energy of fuel into electrical energy and is a system which includes a pair of electrodes configured of an anode and a cathode, having an electrolyte disposed therebetween and obtains electricity and heat by an electrochemical reaction of ionized fuel gas.

A polymer electrolyte membrane fuel cell may have a high current density, a low operation temperature, low corrosion, and a reduced loss of electrolyte, and as a result, has started to be developed as a power source for military use or a space ship. Recently, however, the polymer electrolyte membrane fuel cell may have a high output density and may be modularized due to a simplified apparatus, and as a result, research for applying the polymer electrolyte membrane fuel cell as a power source for a vehicle has been actively conducted.

The fuel cell system includes a fuel cell stack configured to generate electric energy from an electrochemical reaction of reaction gas, a hydrogen supply apparatus configured to supply hydrogen which is fuel to the fuel cell stack, an air supply apparatus which supplies air including oxygen which is an oxidizing agent required for the electrochemical reaction to the fuel cell stack, and a heat and water management system configured to emit heat which is a byproduct from the electrochemical reaction of the fuel cell stack to the exterior to optimally adjust an operation temperature of the fuel cell stack and perform a water management function.

In this configuration, the heat and water management system includes an ion filter, in which the ion filer removes metal ions from cooling water which circulates the fuel cell stack and then is discharged to increase a lifespan of the fuel cell and stabilize the fuel cell system. In other words, the ion filter of the fuel cell vehicle is disposed on a stack cooling water loop to perform ion filtering to prevent an electric shock due to a high output stack that corresponds to 100 kW, thereby assuring electric stability of the system.

For example, an ion resin is installed within a cartridge to remove and manage electric conductivity increased in proportion to an increase in the amount of cation/anion present in the stack cooling water so that the electric conductivity is equal to or less than a predetermined level, thereby increasing insulation stability of the vehicle. Therefore, an inside of the ion filter includes the ion resin which substantially filter ions contained in the cooling water and the cooling water which circulates the fuel cell stack and is discharged enters the ion filter to have the metal ions removed therefrom by the ion resin in the ion filter and then again circulates the fuel cell stack, thereby appropriately adjusting ionicity, that is, electric conductivity within the stack cooling water Meanwhile, the electric conductivity of the stack cooling water is measured by an electric conductivity sensor. In particular, when the electric conductivity measured by the electric conductivity sensor is equal to or greater than a reference value, the ion filter cartridge is replaced to manage the electric conductivity in the stack cooling water to be equal to or less than the predetermined level. For example, the electric conductivity is measured by the electric conductivity sensor and a cooling water electric conductivity signal is periodically transferred to an fuel cell control unit (FCU) through controller area network (CAN) communication to determine whether to replace the ion filter cartridge.

However, in the case of the foregoing electric conductivity sensor sensitive method, a volume of the electric conductivity sensor is increased and costs (100,000 per one) thereof are increased, and thus the electric conductivity sensor sensitive method is disadvantageous in a layout aspect and an economical aspect. Further, when the electric conductivity sensor and the CAN communication are poor, it may be difficult for a consumer to determine the replacement timing of the ion filter cartridge.

SUMMARY

The present disclosure provides an ion filter life perception device for a fuel cell vehicle that improves maintenance of the vehicle by perceiving a replacement life of a fuel cell ion filter cartridge using a principle of reducing a volume of ion resin.

According to an exemplary embodiment of the present disclosure, an ion filter life perception device for a fuel cell vehicle may include: a body part installed within an ion filter and having an ion resin filled therein; a checker disposed within the body part and having a position that varies based on a volume of the ion resin; and an elastic member disposed between one side (e.g., a first side) end in the body part and the checker to push the checker from one side to the other side.

A portion or the whole of the body part may be formed to be transparent. The checker may be made of a fluorescent material and may be formed to maintain air tightness (e.g., a seal) between a circumference of the checker and an inside of the body part. The other side (e.g., a second side) in the body part based on the checker may be filed with the ion resin and the other side in the body part may include a mesh net member to prevent the filled ion resin from leaking. The checker may be configured to identify replacement timing of the cartridge of the ion filter and the body part may be displayed with a moving position of the checker for replacement of the cartridge.

According to another exemplary embodiment of the present disclosure, an ion filter life perception device for a fuel cell vehicle installed in a fuel cell stack may include: a body part configured to be installed within the ion filter to be positioned on a cooling water channel of the fuel cell stack and have an ion resin filled therein; a checker movably disposed within the body part and having a position that varies based on a volume of the ion resin; and an elastic member disposed between one side end in the body part and the checker to push the checker from one side to the other side by elasticity. The body part may be installed within the ion filter to be covered with an upper cap made of a transparent material and thus may be identified from the exterior.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
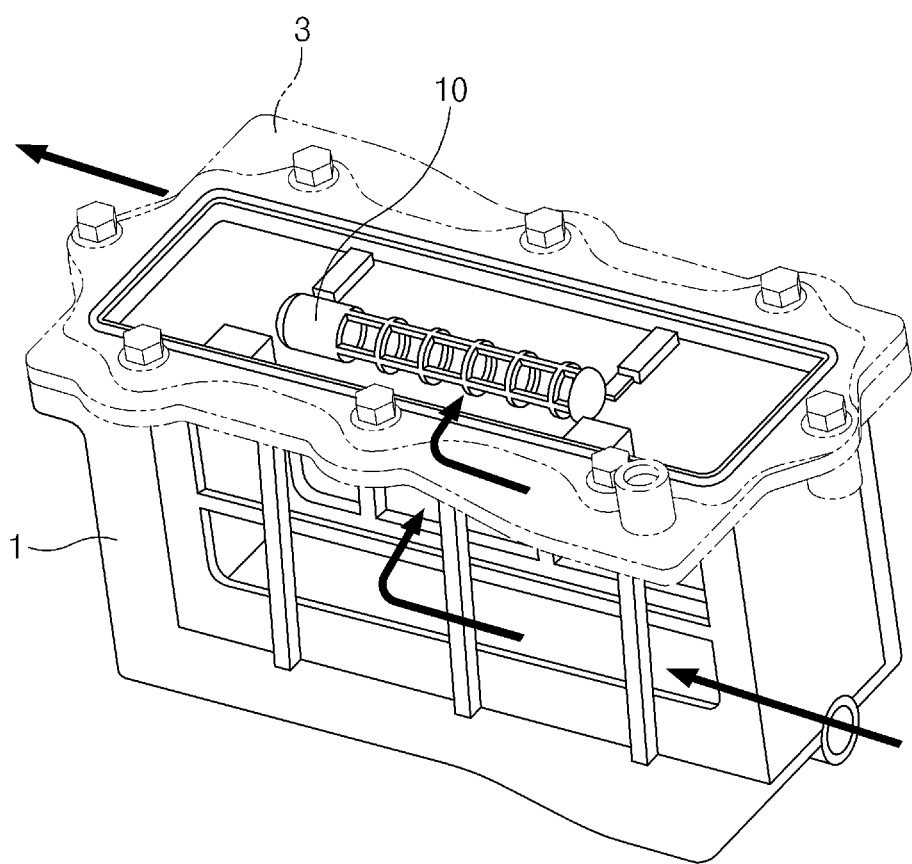
FIG. 1 is an exemplary use state diagram schematically illustrating an ion filter life perception device for a fuel cell vehicle installed within an ion filter according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the tem controller/control unit refers to a hardware device that includes a memory and a processor. The memory is configured to store the modules and the processor is specifically configured to execute said modules to perform one or more processes which are described further below.

Unless specifically stated or obvious from context, as used herein, the tem "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, exemplary embodiments of the present disclosure will be described in detail with reference to the accompanying drawings. However, the present disclosure will be not limited or restricted to the exemplary embodiments below. Like reference numerals proposed in each drawing denote like components.

Figure 2:
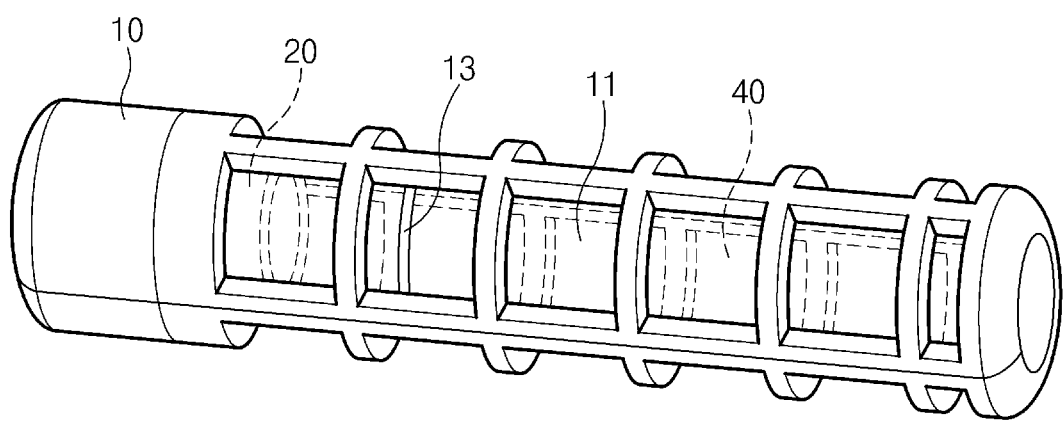
FIG. 2 is an exemplary view illustrating the ion filter life perception device for a fuel cell vehicle according to the exemplary embodiment of the present disclosure.

FIG. 1 is an exemplary use state diagram schematically illustrating a case in which an ion filter life perception device for a fuel cell vehicle according to an exemplary embodiment of the present disclosure is installed in an ion filter and FIG. 2 is an exemplary view illustrating the ion filter life perception device for a fuel cell vehicle according to the exemplary embodiment of the present disclosure.

As illustrated in FIGS. 1 and 2, the ion filter life perception device for a fuel cell vehicle according to an exemplary embodiment of the present disclosure may include a body part 10 installed within an ion filter 1 and having an ion resin filled therein, a checker 20 disposed within the body part 10 and having a position that varies based on a volume of the ion resin, and an elastic member 30 disposed between one side (e.g., a first side) end in the body part 10 and the checker 20 to push the checker 20 from one side to the other side, that is, to push the checker 20 along the inside of the body part 10.

The ion filter 1 may be installed within a fuel cell stack, an ion filter cartridge (not illustrated) may be installed within the ion filter 1, and an upper cap 3 that covers an upper portion of the ion filter 1 and fixes and protects the ion filter life perception device for a fuel cell vehicle according to an exemplary embodiment of the present disclosure may be detachably coupled with the upper portion of the ion filter 1 by a bolt, a pin, and the like to install the ion filter life perception device over the ion filter cartridge. In this configuration, the upper cap 3 may be made of transparent materials such as plastic and glass and thus the ion filter life perception device may be identified from the exterior.

Further, an arrow illustrated in FIG. 1 illustrates a movement of cooling water applied to the fuel cell stack, in which the ion filter 1 and the ion filter life perception device may be positioned on a channel of the cooling water to pass the cooling water which is circulated by passing through the ion filter 1 through both of the ion filter cartridge installed within the ion filter 1 and the ion filter life perception device.

Referring to FIG. 2, the body part 10 may have a substantially can shape (e.g., cylindrical shape) and may be formed to have one side opened and another side closed. Further, the body part 10 may be installed within the ion filter 1 to be identified from the exterior by the upper cap 3 and the cover may have a transparent part 11 made of transparent materials such as plastic and glass and thus the body part 10 may be manufactured to allow a state of the checker 20 and the filled ion resin therein to be recognized from the exterior.

In particular, the checker 20 may be made of a fluorescent material, and the like and thus may be identified from the exterior through the transparent part 11. Further, the checker 20 may be formed to maintain air tightness (e.g., a seal) between the circumference of the checker 20 and the inside of the body part 10 and thus the checker 20 may be formed to move while reacting to a change in the volume of the ion resin filled in the body part 10.

Figure 3:
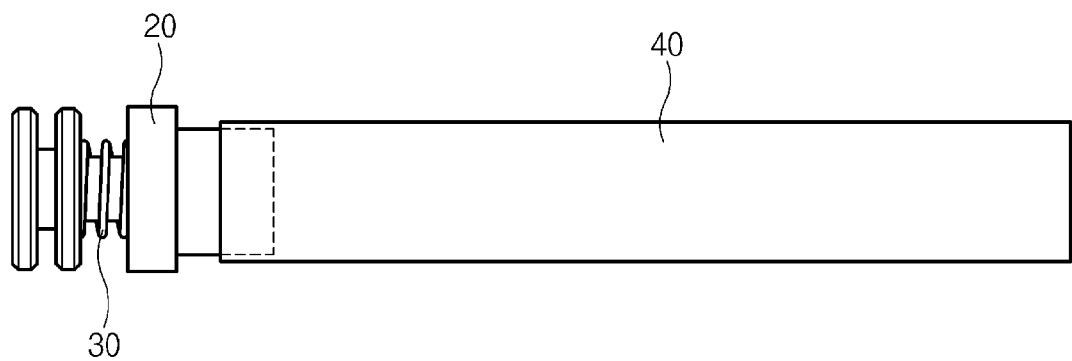
FIG. 3 is an exemplary diagram illustrating main parts in the ion filter life perception device for a fuel cell vehicle according to an exemplary embodiment of the present disclosure, with a body part being removed from the ion filter life perception device.

FIG. 3 is an exemplary diagram illustrating main parts within the ion filter life perception device, with a body part being removed from the ion filter life perception device. Referring to FIG. 3, the inside of the body part 10 may be formed to be biased to one side within the body part 10, the elastic member 30 may be installed between one side (e.g., a first side) of the checker 20 and the one side end in the body part 10 to push the checker 20 from one side to the other side (e.g., along the inside of the body part 10) using an elastic force, and the inside of the body part 10 in the other side (e.g., a second side) direction of the checker 20 may be filled with the ion resin. Therefore, when the volume of the ion resin is reduced, the checker 20 may move in the opposite side direction relative to the reduced amount in the volume of the ion resin by the elastic force of the elastic member 30. The elastic member 30 may be a spring which is generally used, such as a coil spring, a leaf spring, and a line spring.

Meanwhile, a mesh net member 40 may be provided within the body part 10 in the second side direction of the checker 20 to prevent the ion resin filled in the second side direction of the checker 20 from leaking. Further, the body part 10 may be formed with a display part 13 to indicate replacement timing of the cartridge of the ion filter 1 during the movement of the checker 20. In other words, as the display part 13 which may detect a moving position of the checker 20 in the transparent part 11 may be formed in a length direction of the transparent part 11, the replacement timing of the cartridge of the ion filter 10 may be understood based on the reduction in the volume of the ion resin when the checker 20 moves up to the position of the display part 13. A principle of reducing the volume of the ion resin of the ion filter to which the present disclosure is applied will be described below with reference to FIG. 4.

Figure 4:
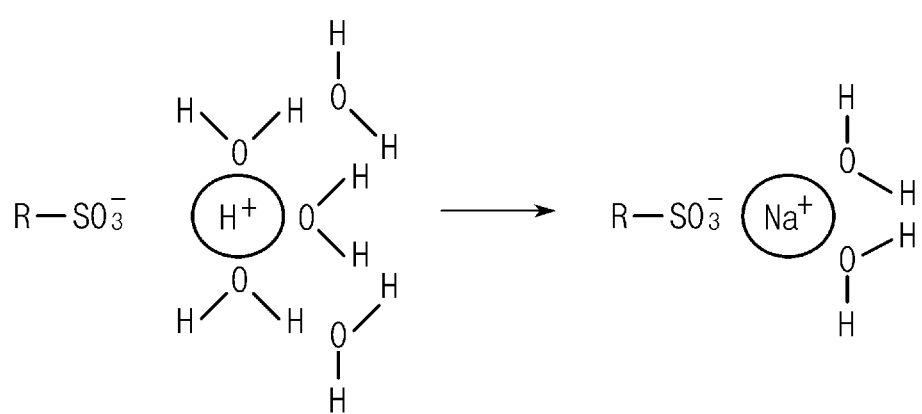
FIG. 4 is an exemplary diagram illustrating a strongly acid cation exchange resin of ion resin in the ion filter life perception device for a fuel cell vehicle according to an exemplary embodiment of the present disclosure.

FIG. 4 is an exemplary diagram illustrating an acid cation exchange resin of ion resin within the ion filter life perception device for a fuel cell vehicle according to an exemplary embodiment of the present disclosure. As illustrated in FIG. 4, an acid cation exchange resin (SAC) is filtered by a scheme such as $R-SO_3H+Na+ \rightarrow R-SO_3Na+H+$ and then may be ion-adsorbed. Further, although not illustrated in the drawings, a base anion exchange resin (SBA) is filtered by a scheme such as $R-NOH+CI- \rightarrow R-NCI+OH-$ and then may be ion-adsorbed.

By the foregoing schemes, a volume of the acid cation exchange resin may be reduced by about 8% and a volume of the base anion exchange resin may be reduced by about 20%. Therefore, when the cartridge of the ion filter reaches the replacement timing due to the reduction in the volume of the ion resin, the checker 20 may move up to the position of the display part 13 and thus the replacement timing of the cartridge may be identified.

According to the present disclosure, the ion filter life perception device for a fuel cell vehicle according to an exemplary embodiment of the present disclosure may be replaced along with the replacement of the ion filter cartridge. The elastic member 30 may be fixedly used and the body part 10 injected with the ion resin, the checker 20, and the mesh net member 40 may be replaced.

The ion filter life perception device for a fuel cell vehicle according to the exemplary embodiments of the present disclosure configured as described above omits the requirement of an electric conductivity sensor to obtain the economical effect of saving the manufacturing costs. Additionally, the need for electronic control is omitted to reduce the fault occurrence rate, save the manufacturing costs by removing the wiring and electromagnetic wave test verification. The present disclosure also has a simplified structure and thus may be more easily manufactured to save the manufacturing costs, and improves the maintenance of the vehicle by confirming the life of the ion filter cartridge in real time by a driver and in a service center.

Although the ion filter life perception device for a fuel cell vehicle according to the exemplary embodiments of the present disclosure has been described with reference to the accompanying drawings, the present disclosure is not limited to the above-mentioned exemplary embodiment and drawings but may be variously modified and changed within the following claims by those skilled in the art to which the present disclosure pertains.

What is claimed is:

1. An ion filter life perception device for a fuel cell vehicle, comprising:
    a body part installed in an ion filter and having an ion resin filled therein;
    a checker disposed within the body part and having a varying position based on a volume of the ion resin; and
    an elastic member configured between a first side end in the body part and the checker to push the checker within the body part in a predetermined push direction,
    wherein the body part includes:
        a mesh net member disposed between the checker and a second side end in the body part and filled with the ion resin; and
        through holes perforated on a wall surface of the body part so that a cooling water penetrates through the mesh net member in a direction forming a predetermined angle with respect to the predetermined push direction.

2. The ion filter life perception device according to claim 1, wherein a portion or the whole of the body part is formed to be transparent.

3. The ion filter life perception device according to claim 1, wherein the checker is made of a fluorescent material.

4. The ion filter life perception device according to claim 1, wherein the checker is formed to maintain air tightness between a circumference of the checker and an inside of the body part.

5. The ion filter life perception device according to claim 1, wherein the checker identifies replacement timing of a cartridge of the ion filter and the body part is displayed with a moving position of the checker for replacement of the cartridge.

6. An ion filter life perception device for a fuel cell stack installed in a fuel cell vehicle, comprising:

a body part installed within an ion filter to be positioned on a cooling water channel of the fuel cell stack and having an ion resin filled therein;

a checker movably disposed within the body part and having a varying position based on a volume of the ion resin; and an elastic member disposed between a first side end in the body part and the checker to push the checker within the body part by elasticity in a predetermined push direction, wherein the body part includes:

a mesh net member disposed between the checker and a second side end in the body part and filled with the ion resin; and through holes perforated on a wall surface of the body part so that a cooling water penetrates through the mesh net member in a direction forming a predetermined angle with respect to the predetermined push direction.

7. The ion filter life perception device according to claim 6, wherein the body part is installed within the ion filter to be covered with an upper cap made of a transparent material and is identifiable from the exterior.

* * * * *